3,477,977
AQUEOUS LACQUERS
Hermann Schnell, Krefeld-Uerdingen, and Rolf Dhein and Karl Raichle, Krefeld-Bockum, and Herbert Gebnauer, Krefeld, Germany, assignors to Farbenfabriken Bayer Aktiengesellschaft, Leverkusen, Germany, a corporation of Germany
No Drawing. Filed May 12, 1967, Ser. No. 637,906
Claims priority, application Germany, May 27, 1966, F 49,309
Int. Cl. C08g 22/04
U.S. Cl. 260—22           6 Claims

ABSTRACT OF THE DISCLOSURE

Aqueous lacquer comprising an ammonium salt of a urethane-group-containing partial ester of maleic oils and lacquer films obtained from the same having improved resistance to water and weather and greater hardness. Lacquers suitable for electrodeposition are disclosed.

---

The present invention relates to aqueous lacquers having a content of ammonium salts of so-called maleic oils, i.e. of addition products of maleic acid or its anhydride or homologues thereof to unsaturated fatty acid esters (comp. e.g. Journal of the Oil and Colour Chemists' Association, vol. 47 (1964), pp. 768 et seq. and Belgian patent specification 633,074, in particular p. 7) partially esterified with polyhydric alcohols, and optionally water-miscible organic solvents as solubilisers, such as are known e.g. from "Paint Manufacture," vol. 36, No. 5 (May 1966), p. 50, left hand column, second complete paragraph, as well as from Belgian patent specification 618,-504.

The aqueous lacquers according to the present invention, compared with these known lacquers, are characterised in that the ammonium salts contained in them are those of urethane-group-containing partial esters of maleic oils possibly also modified with carboxylic acid radicals.

These new lacquers yield lacquer films with increased resistance to water, greater hardness and better resistance to weathering compared with the above-mentioned, partially esterified maleic oils ("Paint Manufacture" loc. cit., Belgian patent specification 618,504), which are free from urethane groups.

The urethane-group content of the modified maleic oils according to the invention on which the ammonium salts are based, the acid- and hydroxyl-numbers of which oils should, in order to ensure adequate capability of dilution with water of their ammonium salts, in each case lie above about 30, preferably between about 50 and about 100, and the ammonium salts of which in a 10% by weight water solution should have a pH-value between about 6.5 and about 8.5, should be so high that it corresponds to at least about 0.05 and preferably up to about 0.2 equivalent of nitrogen per 100 g. of modified maleic oil.

The maleic oils can be prepared in known manner by addition of preferably maleic anhydride or, optionally, maleic acid or also fumaric acid, to unsaturated fatty acid esters. Suitable for this purpose are e.g. esters of fatty acid of linseed oil, fatty acid of safflower, fatty acid of soya bean oil, fatty acid of dehydrated castor oil, fatty acid of tall oil and fatty acid of wood oil with, usually, glycerol, such as are present in the natural oils. However, synthetically prepared esters of other polyalcohols, e.g. of tri-methylol-ethane and -propane, of penta-erythritol, of di-pentaerythritol or of sorbitol, may also be used.

In general, it is expedient to react more than 1 mole of maleic anhydride per mole of fatty acid ester in order that enough acid groups are present for the ensuing reaction with the polyols and for the attainment of water-solubility. Preferably, about 1.8 to about 2.2 mole maleic anhydride are reacted with 1 mole ester. The reaction takes place in a nitrogen atmosphere at temperatures above 100° C., until free maleic anhydride can no longer be detected with dimethylaniline, which, in the reaction between e.g. linseed oil and maleic anhydride at 230° C., is the case after about 2 hours.

The modification of the maleic oils to give products with the above-mentioned characteristics can take place in different ways. Preferably, the maleic oil is reacted with a polyhydric alcohol which already contains urethane groups with the use of such proportions and such reaction conditions that the end product possesses the acid- and hydroxyl-number demanded.

Preferably, the work is carried out in such a manner that about one ester group is formed per anhydride group or dicarboxylic acid group of the maleic oil, i.e., poly-semi-esters containing urethane groups are formed.

As is general in the case of polyesters of which the molecular weight is determined by, besides the reaction conditions, to a particular extent by the proportion of polyol to polycarboxylic acid as reactants, so also in the case of the here preferred poly-semi-esters of the maleic oils is their molecular weight influenced essentially by the mixture proportions of maleic oil to polyalcohol.

If the maleic oil contains e.g., as here preferred, about 2 anhydride groups or 4 carboxylic acid groups, it is bi-functional in the sense of a semi-ester formation. If such a, to this extent bifunctional, maleic oil is reacted with an approximately equimolar amount of a urethane-group-containing polyol, a polyester of maximum chain length is obtained which tends to readily form a gel. If, on the other hand, 1 mole of a, to this extent bifunctional, maleic oil is reacted with about 2 mole of a urethane-group-containing polyol, a semi-ester of maximally low molecular weight is obtained. By the choice of a molar ratio of maleic oil to polyol between 1 and 2, it is therefore possible to set up poly-semi-esters of any desired molecular weight. A preferred region lies in a molar ratio of these two components of about 1:1.3 to 1:1.8.

Urethane-group-containing polyols are addition products of isocyanates to polyalcohols in which isocyanates and polyalcohols have been reacted with one another in such proportions that all isocyanate groups were converted into urethane groups and there are still sufficient free hydroxyl groups available for the reaction with maleic oil. Suitable isocyanates are e.g.

phenylisocyanate,
p-chlorphenylisocyanate,
cyclohexylisocyanate,
ethylenediisocyanate,
1,2-cyclohexylenediisocyanate,
toluylenediisocyanate-2,4 and -2,6,
diphenylmethane-4,4'-diisocyanate,
triphenylmethane-4,4',4''-triisocyanate,
naphthylene-1,5-diisocyanate,
3,3'-dichlor-4,4'-biphenylene-diisocyanate and
hexamethylenediisocyanate.

Suitable polyalcohols are e.g.

ethyleneglycol,
diethyleneglycol,
triethyleneglycol,
propyleneglycol,
butanediol-1,3 and -1,4,
glycerol,
trimethylolpropane,
pentaerythritol,
sorbitol,
cyclohexanediol-1,2, -1,3 and -1,4,
4,4'-dihydroxydicyclohexylpropane and
2,2-bis-(4-β-hydroxyalkoxyphenyl)-alkanes and their partial esters with fatty acids or other monocarboxylic acids, benzoic acid or resin acids. In order to avoid gel formation, the co-employment of monohydric alcohols is advisable when more than bifunctional isocyanates are used.

The polyalcohols and isocyanates may be added together in a nitrogen atmosphere at room temperature, the reaction mass becoming very hot through the reaction heat which is liberated. Preferably, however, the work is carried out in such a manner that the polyalcohols are preheated to elevated temperature, e.g. 130° C., and reacted at this temperature with the isocyanate so slowly that the reaction temperature once chosen is not exceeded.

Since in many cases merely minor urethane-group contents of the finished lacquer raw materials suffice, urethane-group-containing polyols may, optionally, also be reacted in admixture with urethane-group-free polyalcohols with the maleic oils. It is possible not to admix these polyalcohols until the reaction with the maleic oil, but they may also be added before the reaction of the polyol with the isocyanate, so that the excess of polyols with respect to isocyanates is so great that only a portion of the polyols is converted into urethane-group-containing polyols. The latter earns preference if the urethane polyols are not clearly miscible with the maleic oil, since according to this method of preparation polyol mixtures are formed which with maleic oils yield clear melts more rapidly, so that a more uniform reaction is ensured.

Polycarboxylic acids or their anhydrides, the radicals of which, together with the maleic oils, may possibly form a constituent of the reaction products with the urethane-group-containing polyols are expediently used when for the desired application of the lacquer raw material there would be formed with the sole use of maleic oils as reactants lacquer raw materials with too high an oil content. Suitable polycarboxylic acids or anhydrides for this purpose are those usually employed in preparation of alkyd resins, such as phthalic anhydride, tetrahydrophthalic anhydride, trimellitic anhydride and pyrromellitic anhydride, but also adipic acid and isophthalic acid. These acids or anhydrides can be reacted together with the maleic oils with the polyols, but they can also be reacted subsequently with the partial esters of the maleic oils with the urethane-group-containing polyols.

The reaction of the maleic oils and, optionally, acids or acid anhydrides, with the urethane-group-containing polyols and, optionally, other polyalcohols, is expediently carried out in an inert gas atmosphere, e.g. under nitrogen, at temperatures above about 100° C., preferably at 140–150° C. A reaction time of ½ to 3 hours is often sufficient to obtain the desired, clear reaction product. If, even at elevated temperature, there exists initially an incompatibility of the reactants, this can be overcome by previous reaction of the maleic oil with water in order to split up the anhydride groups.

The reactants must be reacted with each other in such proportions and for such a time that there are still enough free carboxyl and hydroxyl groups present to bring about, with ammonia or suitable amines and, optionally, organic solvents, an adequate capability of dilution with water. Thus, e.g. an acid number of 30 and a hydroxyl number of 30 may suffice. However, better capability of dilution is given with an acid number of about 50–90 and a hydroxyl number of about 50–100. Higher hydroxyl numbers and/or acid numbers improve distinctly the capability of dilution with water, especially when the co-employment of organic, water-miscible solvents is to be desisted from. However, if the binding agents are intended for electrophoretic application processes, the acid number of the lacquer raw materials should, if possible, lie below 100, since particularly good lacquerings are achieved with binding agents of which the specific electrical resistance is greater than 800Ω·cm., measured in an aqueous solution containing 10% of binding agent, and high acid numbers strongly affect the specific resistance.

Since the content of urethane groups in the lacquer raw materials determines the said improvements of the lacquerings, such as hardness and resistance to water, the reaction mixture consisting of maleic oil, optionally, acid or acid anhydride, urethane-group-containing polyol and, optionally, other polyalcohols, should be so composed that the finished reaction product contains urethane groups in sufficient number.

The modified maleic oils can, however, also be prepared in other sequences. Thus, it is possible e.g. to first react the maleic oil, optionally with the co-employment of polycarboxylic acids or their anhydrides, with the polyhydric, urethane-group-free alcohols and, lastly, to react the obtained partial esters with isocyanates, in which case, however, the proportions of the individual reactants and the reaction conditions must be so co-ordinated with each other that adequate amounts of free carboxyl and hydroxyl groups remain preserved and, preferably, only about one ester group is formed from each anhydride group or dicarboxylic acid group of the maleic oil, so that, finally, urethane-group-containing poly-semi-esters are again obtained.

The finished, urethane-group-containing, modified maleic oils can be dissolved directly in ammonia or in water which contain a suitable amine. However, it is also possible to prepare beforehand solutions in wholly or partially water-miscible organic solvents which are then, after addition of the basic component, capable of being further diluted with water. Suitable basic components are, besides ammonia, e.g. ethylamine, dimethylamine, diethylamine, triethylamine, ethanolamine, diethanolamine, triethanolamine, dimethylethanolamine and morpholine.

From the large number of suitable, wholly or partially water-miscible organic solvents, such as alcohols, esters, ketones, ketone alcohols, ethers and ether alcohols there are mentioned as examples ethyleneglycolmonomethyl, -ethyl, -butyl ether, tert.-butanol, isobutanol, isopropanol, diethyleneglycol, dioxan and dimethylformamide.

If ethanolamines are used for the salt formation, it suffices in most cases that a pH-value of about 7.0–7.5, measured in a sample diluted with water to a 10% resin content, be set up in order to prepare well-storable solutions capable of being diluted clear with water.

The aqueous lacquers according to the invention can be processed according to the usual application processes, such as immersion, spraying or pouring, but especially well according to the electrophoretic application process. For lacquers which are to be applied electrophoretically, a particularly great dilution with water is advisable, so that lacquers with binding agent contents of 10% by weight and less are formed. Even from still more greatly diluted solutions which contain only 0.1–1% by weight of binding agent, there are formed in the shortest time firmly adhering lacquers of excellent flow and very good elasticity and water resistance.

If the binding agents are used for the preparation of pigmented lacquers, the known pigments and methods of grinding can be chosen.

Besides pigments and fillers, the lacquers may also contain other additives. Such auxiliaries are for example metal salts which act as siccative, antifoam agents and cross-linking agents, such as melamine-, urea- and phenol-formaldehyde resins.

Other lacquer raw materials capable of being diluted with water, such as water-dilutable alkyd resins and water-dilutable acrylic resins, can be considerably improved by additions of the new lacquer raw materials. In this way there can also be used for example for the electrophoretic application process those lacquers which would be less suitable for this without addition of the new binding agents.

Preferably, the lacquerings prepared from the lacquers according to the invention are hardened at elevated temperatures, e.g. 150° C. However, even at much lower temperatures, e.g. at 60° C. or 20° C., lacquerings free from tackiness are obtained.

The parts stated in the following are parts by weight if not expressly otherwise indicated.

EXAMPLE 1

(a) To 2,728 parts ethyleneglycol 1,914 parts toluylenediisocyanate-2,4 are added dropwise, with stirring and in a nitrogen atmosphere, in such a manner that the reaction mixture reaches a temperature of about 130° C. through the exothermic reaction which sets in rapidly. After completion of the reaction, the reaction temperature of 130° C. is maintained for about one hour and cooling is then effected.

A mixture of 738.5 parts of this urethane-group-containing polyol mixture with 3,738 parts of a maleic oil prepared from linseed oil and maleic anhydride in a molar ratio of 1:2 by addition at 230° C. in a nitrogen atmosphere with, after splitting up of the anhydride groups, a measurable acid number of about 140–160 and a viscosity of about 30″ (measured in a 60% solution in dimethylformamide according to German Industrial Standard 53211) is heated to 145° C., with stirring, and left at this temperature until a clear reaction product with an acid number of 64 and a viscosity of 58″ (40% in xylene) is formed.

While still warm this resin is then dissolved 98% in ethyleneglycolmonobutyl ether and there is added, below 80° C., such an amount of triethylamine that a solution diluted with distilled water to 10% resin content has a pH-value of 7.4–7.5, measured with the glass electrode. For easier handling, the concentrated resin solution is then diluted with water to a resin content of 55%.

From 303.1 parts of the 55% resin solution, 83.3% parts titanium dioxide (rutile, finely dispersed) and 2,113.6 parts water a lacquer with a binder content of 6.67 percent by weight is prepared and poured into a metal basin suitable for electrophoretic lacquering processes. This lacquer has a specific resistance of 1750Ω·cm. at a pH-value of 7.5. A 6.5 x 16.4 cm. sheet of metal is immersed 11.5 cm. deep and, for two minutes, a direct current voltage is applied between the metal sheet and the metal basin in such a manner that the metal sheet forms the anode. After the switching off of the current and the taking out of the metal sheet, the latter is coated with a uniform, firmly adhering lacquer layer which cannot be washed off with water and which is hardened in 30 minutes at 150° C. and then yields a very well flowed, smooth, about 40–45μ thick film with good adhesion and a pendulum hardness according to König of 46″. Even after a water storage of 480 hours, the lacquering is completely blister-free.

Against this, the following comparison shows that a lacquer on the basis of a urethane-group-free maleic oil ester of otherwise identical composition yields lacquerings of distinctly lesser quality.

(b) 992 parts ethyleneglycol and 592 parts phthalic anhydride are etherified in a nitrogen atmosphere at 180–200° C. until a reaction product with an acid number of about 3 is obtained.

661.5 parts of this polyol mixture containing ester groups instead of urethane groups are reacted as described under (a) with 3,738 parts maleic oil at 145° C. until a clear resin of the acid number 70 and viscosity 53″ (50% in xylene) is formed. It is, as described above, processed into a 55% solution.

A correspondingly prepared and composed lacquer has a specific resistance of 1850Ω·cm. at a pH-value of 7.4 to 7.5. Lacquers applied electrophoretically and hardened under the same conditions have a pendulum hardness of only 22″ and are full of blisters after only 96 hours storage in water.

EXAMPLE 2

From 2,015 parts ethyleneglycol and 2,262 parts toluylenediisocyanate-2,4 a urethane-group-containing polyol mixture is prepared in a nitrogen atmosphere at 130° C.

1,151.5 parts of this polyol mixture are than reacted with 103.6 parts phthalic anhydride and 2,889 parts maleic oil according to Example 1a at 145° C. until a clear reaction product with an acid number of 56 and a viscosity of 138″ (40% in xylene) is formed. The resin is dissolved 87% in ethyleneglycolmonobutyl ether and then such an amount of triethanolamine is added that a sample can be diluted clear with water to a 10% resin content and has in this dilution a pH-value of 7.6–7.7 and a specific resistance of 890Ω·cm. To prepare a lacquer well capable of being deposited electrophoretically, the thus neutralised product is diluted with distilled water to 55% resin content.

When there is prepared from this 55% aqueous resin solution a lacquer according to Example 1, this lacquer has a specific resistance of 1550Ω·cm. and yields, when precipitated electrophoretically at 150 volts onto iron sheets, lacquerings which, after a burning-in period of 30 minutes at 50° C., adhere very well, are highly elastic with a layer thickness of 44–47μ, have a pendulum hardness of 56″ and are still completely blister-free even after 480 hours in water.

We claim:
1. An aqueous lacquer composition comprising an ammonium salt of:
(A) the reaction product of a maleinized oil and a urethane group containing polyol which is the preformed reaction product of an organic isocyanate and an excess of a polyol or
(B) the reaction product of a maleinized oil and a polyol subsequently reacted with an organic isocyanate,
each of (A) and (B) having an acid number of about 50 to 90, an hydroxyl number of 50 to 100 and the urethane content of 100 g. thereof corresponding to about 0.05 to about 0.2 equivalents.

2. Lacquers according to claim 1, wherein the ammonium salts in a 10% by weight water solution have a pH-value between about 6.5 and about 8.5.

3. Lacquers according to claim 1, wherein the salts are those selected from the group consisting of ammonia, ethyl amine, dimethyl amine, diethyl amine, triethyl amine, ethanol amine, diethanol amine, triethanol amine, dimethyl ethanol amine and morpholine.

4. Lacquers according to claim 1 containing, in addition to water, water-miscible organic solvents selected from the group consisting of alcohols, esters, ketones, ketone alcohols, ethers and ether alcohols.

5. Lacquers according to claim 1 having from about 0.1 to about 55% by weight of said ammonium salt.

6. A substrate coated with a lacquer film produced from a lacquer according to claim 1.

References Cited

UNITED STATES PATENTS

| | | | |
|---|---|---|---|
| 3,357,936 | 12/1967 | Zimmerman et al. | 260—22 |
| 3,308,077 | 5/1967 | Pattison et al. | 260—18 |
| 3,305,501 | 2/1967 | Spalding | 260—18 |
| 3,297,557 | 1/1967 | Huggard | 260—18 |
| 3,293,201 | 12/1966 | Shanade et al. | 260—18 |
| 3,251,790 | 5/1966 | Christenson et al. | 260—18 |
| 3,210,302 | 10/1965 | Bowell et al. | 260—18 |
| 3,369,983 | 2/1968 | Hart et al. | 260—22 |

DONALD E. CZAJA, Primary Examiner

C. W. IVY, Assistant Examiner

U.S. Cl. X.R.

117—161, 132; 204—181; 260—18, 29.2, 29.3, 29.4, 32.6, 33.2 33.4

PO-1050
(5/69)

UNITED STATES PATENT OFFICE
CERTIFICATE OF CORRECTION

Patent No. __3,477,977__   Dated __November 11, 1969__

Inventor(s) __Hermann Schnell, Rolf Dhein, Karl Raichle and Herbert Gebnauer__

It is certified that error appears in the above-identified patent and that said Letters Patent are hereby corrected as shown below:

Col. 5, line 24, "98%" should read -- 87% --;

line 32, "83.3%" should read -- 83.3 --;

line 56, "etherified" should read -- esterified

SIGNED AND
SEALED
JUN 23 1970

(SEAL)
Attest:

Edward M. Fletcher, Jr.
Attesting Officer

WILLIAM E. SCHUYLER, JR.
Commissioner of Patents